No. 711,215. Patented Oct. 14, 1902.
E. KEMPSHALL.
MANUFACTURE OF PLAYING BALLS.
(Application filed June 14, 1902.)
(No Model.)
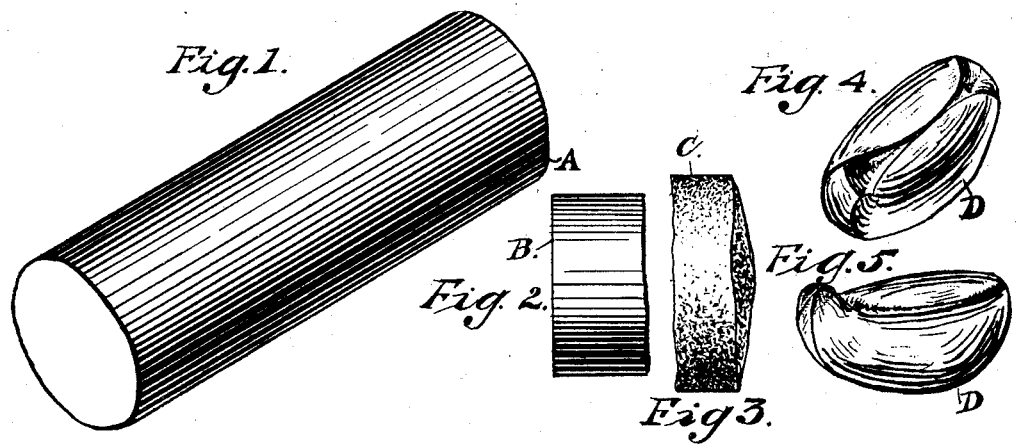
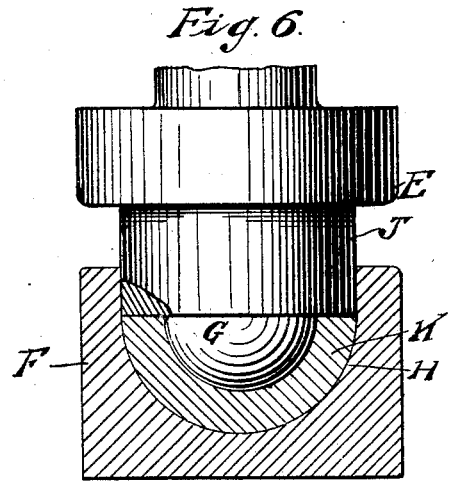
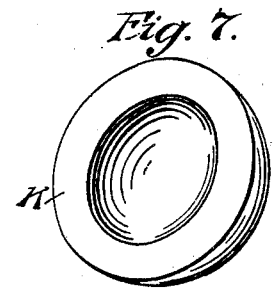
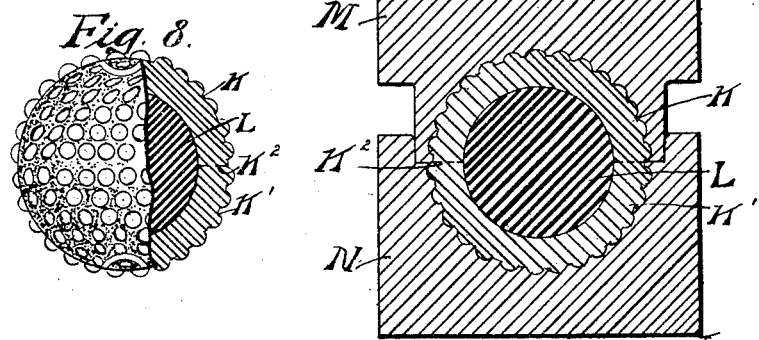
Witnesses:
J. E. Davidson
Fred O. Maynard
Inventor:
Eleazer Kempshall.
By his Attorney.
F. H. Richards

UNITED STATES PATENT OFFICE.

ELEAZER KEMPSHALL, OF BOSTON, MASSACHUSETTS.

MANUFACTURE OF PLAYING-BALLS.

SPECIFICATION forming part of Letters Patent No. 711,215, dated October 14, 1902.

Application filed June 14, 1902. Serial No. 111,774. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in the Manufacture of Playing-Balls, of which the following is a specification.

This invention relates to the manufacture of balls for use in golf and other games; and its objects are to improve the stanchness and efficiency of gutta-percha shells or balls and also to provide for producing balls of uniform and reliable quality at low cost.

Gutta-percha balls usually lose their shape when subjected to the summer heat, and the principal purpose of my invention is to overcome this objection. I apprehend that the softening relieves the strains throughout the material and that it hence assumes a shape in which the particles will be under less strain. As gutta-percha possesses to a phenomenal degree the power of carrying or flying when struck a hard blow by a club, it is of especial value in golf-balls, and hence it is highly desirable to reduce the liability of the softening of the ball and, further, to minimize or prevent the distortion thereof when so softened.

My improvements relate principally to a gutta-percha shell; but it is to be understood that an entire gutta-percha ball may be formed within the scope of my invention.

Referring to the drawings forming part of this specification, Figure 1 is a cylinder of gutta-percha in its commercial form. Fig. 2 is a view of a cake cut from the end of said cylinder. Fig. 3 is a view of the shape assumed by said cake when softened by heat, this view illustrating the peculiar tendency of the gutta-percha to change its shape when heated and also illustrating a stage in the process of producing an entire ball. Fig. 4 illustrates in perspective, and Fig. 5 in side elevation, the shape into which the Fig. 3 article is molded while heated and soft. Fig. 6 represents a process to which the Fig. 5 article is subjected in order to produce a half-shell, the latter being illustrated in perspective at Fig. 7. Fig. 8 shows a completed ball, and Fig. 9 illustrates the last stage in forming the ball.

Similar characters of reference designate like parts in the figures.

From the usual cylindrical bar A, of gutta-percha, I cut off a cake B, which by heating I render plastic or moldable, the heat having the effect of increasing the diameter and reducing the thickness, as at C, Fig. 3. While the gutta-percha is in this condition I preferably mold it to a form roughly resembling a half-sphere, as at Figs. 4 and 5. I then place it between forming-dies E and F, Fig. 6, the former being cylindrical and having a hemispherical bottom G and the latter a larger hemispherical cup H of the same diameter as the main cylindrical portion J at the lower end of said plunger E. The gutta-percha is heated by the die and brought into a plastic condition, whereupon the parts E and F of the die are brought together with great force, thereby compacting the gutta-percha and rendering it tougher and more thoroughly cured. The heating of the gutta-percha by the dies before the pressure tends to relieve the strains inherent in the gutta-percha, so that after being formed into a half-shell, as at K, Figs. 5 and 6, the gutta-percha is much less liable to soften or at least to change its shape by the action of moderate heat than when in the condition shown at B or D. Two of these segments, as K and K', I place over a spherical center piece L, preferably of soft rubber and preferably somewhat too bulky for the capacity of the shell. The parts thus assembled are placed between forming-dies—as, for instance, M and N—whereupon the latter are heated, the heat being preferably just sufficient to bring the gutta-percha to a slightly-plastic condition, so as to relieve the strains or stresses thereof. The said dies M and N are then brought together with great force, a weld being effected between the segments at $K^2$, and the gutta-percha being still further compacted and seasoned and rendered still less liable to damage from a moderate heat. The gutta-percha is highly compressed between the dies and the center piece L, the latter, therefore, acting first as an instrumentality in the final pressure treatment of the gutta-percha and then serving as a core for the ball. Thus it will be seen that the gutta-percha is twice subjected to a combined heating and compressing operation, and it is found in practice that balls made in this way are so nearly immune to loss of shape by reason of exposure to the heat of the sun as to be of far greater value than gutta-percha shells or solid balls heretofore produced.

It will be seen that the gist of my invention consists in subjecting the gutta-percha of the ball to repeated heating and simultaneous compression, and so far as this feature is concerned it is not essential in all cases that the treatment be limited to the shell, as it may be applied to a solid gutta-percha ball without departing from my improvements. I prefer, however, to compress this previously-treated shell upon a filling of rubber, since the latter aids to a certain extent in preserving the spherical form of the ball under all conditions.

Preferably the edges of the segments contact before much, if any, compression of the core is effected, so as to avoid liability of the core material squeezing out between said edges.

The compression of the ball is maintained while the shell cools and hardens, so that the latter may hold the ball under permanent compression or grip. It is to be understood that in case condensation of the bulk of the shell or core takes place in the operation of compressing the shell upon the core it is due to the presence of air-spaces or impurities in the material. It is not essential in all cases that the core be condensed in bulk so long as when the ball is finished the core is powerfully gripped by the shell, thereby enabling shell and core to act conjointly, and hence vastly improving the playing qualities of the ball.

The outward pressure due to the constant effort of the compressed core to enlarge its confines is of material assistance in enabling the ball to spring instantly back to its original shape, and hence conduces to the efficiency thereof. Moreover, owing to its compression said core is more resisting, and when struck it sooner reaches the limit of compression, so that less force is wasted in changing and rechanging the shape of the ball and more momentum is acquired by the ball from the implement. The compressed core gives an even resistance at all portions of the shell, so that a reliable and uniform action of the ball is secured. The core always maintains its true central position, thereby minimizing the tendency to erratic flight or movement.

Variations in method and structure may be resorted to within the scope of the improvements set forth herein.

Having described my invention, I claim—

1. A process in producing a hemispherical shell-segment, consisting in heating gutta-percha, molding it while heated into a shape approximating a hemispherical shell-segment, and then forming it while heated and under great pressure into a perfect hemispherical shell-segment.

2. A process in producing a playing-ball, consisting in heating gutta-percha, molding it into a roughly approximate shape while heated, forming it by pressure into half-shells while heated, placing the half-shells upon a core, subjecting the shells to pressure while heated and thereby causing the edges to weld, and maintaining the pressure while the shell hardens.

3. A process in producing a playing-ball, consisting in heating cakes of gutta-percha, converting them by pressure into hemispherical segments while heated, placing said segments upon a core, reheating the segments, subjecting them to great pressure while heated, and thereby causing their edges to weld, and maintaining the pressure while the shell cools and hardens.

4. The process of producing a playing-ball consisting in heating a mass of gutta-percha, shaping it roughly into a round form and allowing it to cool, reheating said mass and compressing it into the form of a hemispherical segment and pressing a core within said segment, pressing a similar segment upon said core, heating and pressing the whole and maintaining the compression until the shell hardens.

ELEAZER KEMPSHALL.

Witnesses:
F. W. BARNACLO,
B. C. STICKNEY.